Figure 1:
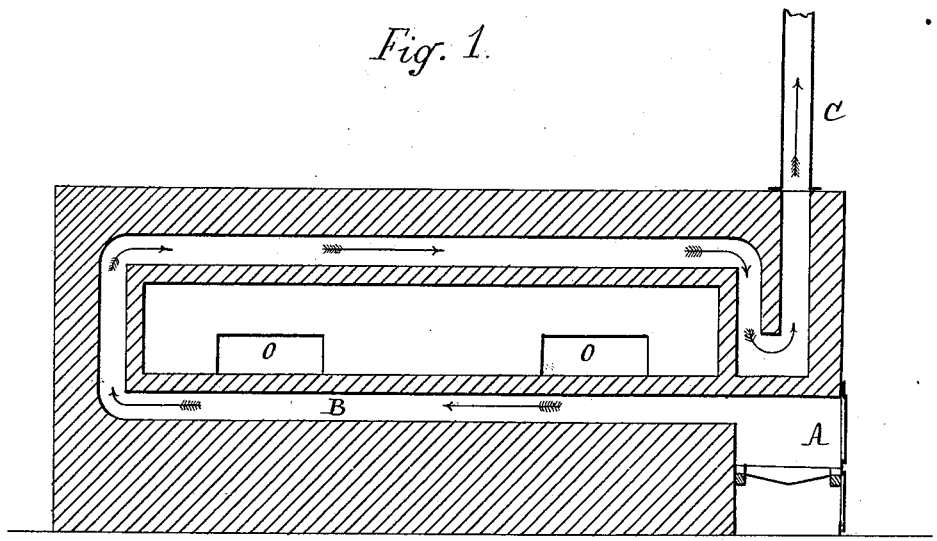

(No Model.)

F. B. A. ROYER DE LA BASTIE.
MANUFACTURE OF ARTICLES MADE FROM TOUGHENED GLASS.

No. 334,754. Patented Jan. 26, 1886.

WITNESSES:

INVENTOR:

By his Attorneys,

UNITED STATES PATENT OFFICE.

FRANÇOIS BARTHÉLEMY ALFRED ROYER DE LA BASTIE, OF PARIS, FRANCE.

MANUFACTURE OF ARTICLES MADE FROM TOUGHENED GLASS.

SPECIFICATION forming part of Letters Patent No. 334,754, dated January 26, 1886.

Application filed September 22, 1885. Serial No. 177,823. (No model.) Patented in England July 30, 1884, No. 19,786.

*To all whom it may concern:*

Be it known that I, FRANÇOIS BARTHÉLEMY ALFRED ROYER DE LA BASTIE, a citizen of the French Republic, and a resident of Paris, France, have invented certain new and useful Improvements in the Manufacture of Articles Made from Toughened Glass, of which the following is a specification.

In order to enable the glass-toughening process (which consists in plunging the heated glass into a heated liquid bath) to be applied in the manufacture of articles for table service, it is necessary that opal glass should be employed, in order that it may resemble porcelain as much as possible; but as the toughening process is not readily applicable to opal glass the manufacture is, according to the present invention, carried out as follows: The article is, in the first instance, formed of opal glass, made as thin as practicable, and this is then coated in any known manner, either on one face, or, preferably, on both faces, with one or with two layers of ordinary glass or crystal glass, and the articles thus formed of a combination of opal and transparent glass will then readily lend themselves to the toughening process, which may then be carried out in the ordinary manner, but which is, by preference, conducted as will be presently described. By this means a plate is obtained having the opaque nature of opal with an external coating of toughened glass or crystal, so that the internal mass of opal glass is not in any way injuriously affected by the toughening process, in consequence of the protecting-coating. Objects constructed in this manner will effectually resist violent shocks and the action of hot water, and even fire, and they are not liable to become chipped at the edges. It will be evident that this process can be applied to the manufacture of vessels ornamented in any desired manner.

The opal glass can be colored, gilded, or coated with either metals of any desired colors, or designs or flowers may be printed thereon with vitreous colors; also, designs painted on asbestus cloth may be applied thereto, or they may be enameled in any colors, the surfaces so prepared being in all cases protected by the coating of toughened glass or crystal, and being thus preserved from deterioration they are of a very durable nature.

For toughening plates, constructed as described, in the most effectual manner, they are reheated to a high degree in the opening of the melting-furnace. They are then placed upon a mold fixed underneath a press, and they are pressed, in order to impart to them the exact configuration required. The plate is then taken to the reheating-furnace. The opal glass is subjected with greater difficulty to the reheating process than the ordinary glass, on account of the radiation caused by its color. In the opening of the melting-furnace its surfaces become heated too quickly to allow the body thereof to become heated to the same temperature. This is not the case when a special reheating-furnace is used which is only raised to the required temperature, and in which the object can remain any desired length of time for becoming uniformly heated without risk of becoming deformed or adhering to the mold.

The reheating-furnace and apparatus may be constructed in various ways, the preferred form being that shown in the accompanying drawings, wherein—

Figure 2:
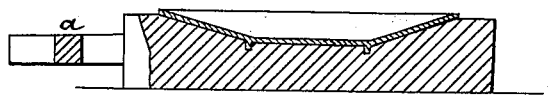
Figure 3:
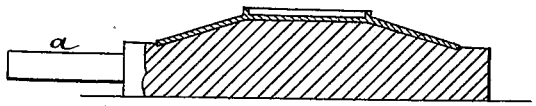

Figure 1 is a longitudinal vertical section of the furnace. Figs. 2 and 3 represent, in transverse section, the two molds required for heating a plate, the latter being shown in section also and in position on the molds.

It consists of a fire-grate, A, the flames from which pass through the flues B to the chimney C. O O are the working-openings. Within the furnace are molds of fire-clay, having the exact configuration of the plates. Two molds are required for each plate, one for each surface thereof—namely, a mold, as shown at Fig. 2, for the under side, and a second mold, as shown at Fig. 3, having the configuration of the upper side.

The furnace always contains at least two molds of each kind in front of each working-opening. These molds are only taken out of the furnace for being placed upon the slab in front of the working-opening during the time necessary to place thereon the plate to be treated.

The operator is situated in front of one of the openings and operates upon the plates which he has in front of him, while a boy introduces through the other opening freshly-formed plates.

When the operator has subjected the plates at the one opening to the toughening process, he changes his place and proceeds in the same manner with the plates situated at the other opening.

The object of using two molds for each plate is as follows: The mold should always have the temperature of the furnace. When there is placed upon one of the molds a plate which has come from the press, it communicates its heat to the surface with which it is in contact, while the other surface of the plate is directly subjected to the action of the furnace heat. When this surface has been heated to the required degree, the plate is turned over onto the other mold, so as to subject the other surface, which was in contact with the first mold, to the furnace heat, while the mold on which the plate is now placed being at the same temperature as the furnace, it in no way cools the surface of the plate lying thereon. Thus the plate is heated to a perfectly uniform temperature before being subjected to the toughening process. The mold upon which the plate was first placed having imparted some of its heat thereto, it requires to be subjected to the furnace heat again before receiving a second plate.

The molds are manipulated by means of a handle, the end of which is formed like a pair of tongs, which are caused to seize the handle $a$ on the molds. When a mold has been used, the workman removes his handle from it and cools it in water, and then applies it to another mold.

Having thus described my invention, I claim—

As an improved article of manufacture, an article having its body made from opal glass and its surface composed of toughened glass, substantially as described.

In witness whereof I have hereunto signed my name in the presence of two subscribing witnesses.

FRANÇOIS BERTHÉLEMY ALFRED ROYER
DE LA BASTIE.

Witnesses:
ROBT. M. HOOPER,
AMAND RITTER.